United States Patent [19]

Watanabe et al.

[11] Patent Number: 4,849,614

[45] Date of Patent: Jul. 18, 1989

[54] COMPOSITE IC CARD

[75] Inventors: Hiroshi Watanabe, Kokubunji; Yoshihide Okubo, Chiba, both of Japan

[73] Assignee: Toppan Moore Company, Ltd., Tokyo, Japan

[21] Appl. No.: 943,673

[22] Filed: Dec. 18, 1986

[30] Foreign Application Priority Data

Dec. 27, 1985 [JP] Japan .................. 60-295481
Dec. 27, 1985 [JP] Japan .................. 60-295482
Mar. 31, 1986 [JP] Japan .................. 61-73185
Mar. 31, 1986 [JP] Japan .................. 61-73186

[51] Int. Cl.⁴ .......................................... G06F 15/30
[52] U.S. Cl. .................... 235/379; 235/380; 235/382; 340/825.31
[58] Field of Search .............. 235/379, 380, 381, 382, 235/382.5, 492; 340/825.31, 822.34

[56] References Cited

U.S. PATENT DOCUMENTS

| | | | |
|---|---|---|---|
| 3,985,998 | 10/1976 | Crafton | 340/825.34 |
| 4,204,113 | 5/1980 | Giraud et al. | 235/380 |
| 4,578,567 | 3/1986 | Granzow et al. | 235/379 |
| 4,656,342 | 4/1987 | Ugon | 235/379 |
| 4,683,372 | 7/1987 | Matsumoto | 235/380 |
| 4,709,137 | 11/1987 | Yoshida | 235/492 |
| 4,734,568 | 3/1988 | Watanabe | 235/380 |
| 4,742,215 | 5/1988 | Daughters et al. | 235/379 |

FOREIGN PATENT DOCUMENTS 61-18794 5/1986 Japan.
61-134872 6/1986 Japan.
61-139876 6/1986 Japan.

Primary Examiner—A. D. Pellinen
Assistant Examiner—H. L. Williams
Attorney, Agent, or Firm—Kenyon & Kenyon

[57] ABSTRACT

A composite IC card for controlling information of a plurality of different enterprises using an IC card in which a memory is divided into a plurality of storage areas and which has a code store section for storing a plurality of codes necessary to access the storage areas, a first code specify section for specifying a first code corresponding to each enterprise, a second code specify section for specifying a second code set according to the security level of each storage area, a code read section responsive to an instruction to access a desired storage areas from an external device for reading the first and second codes from the code store means, a code collate section for collating the externally inputted code with the code read by the code read section, and a section for allowing the access to the desired storage area thus instructed when all collations in the collate section result in a match.

15 Claims, 10 Drawing Sheets

F I G. 1
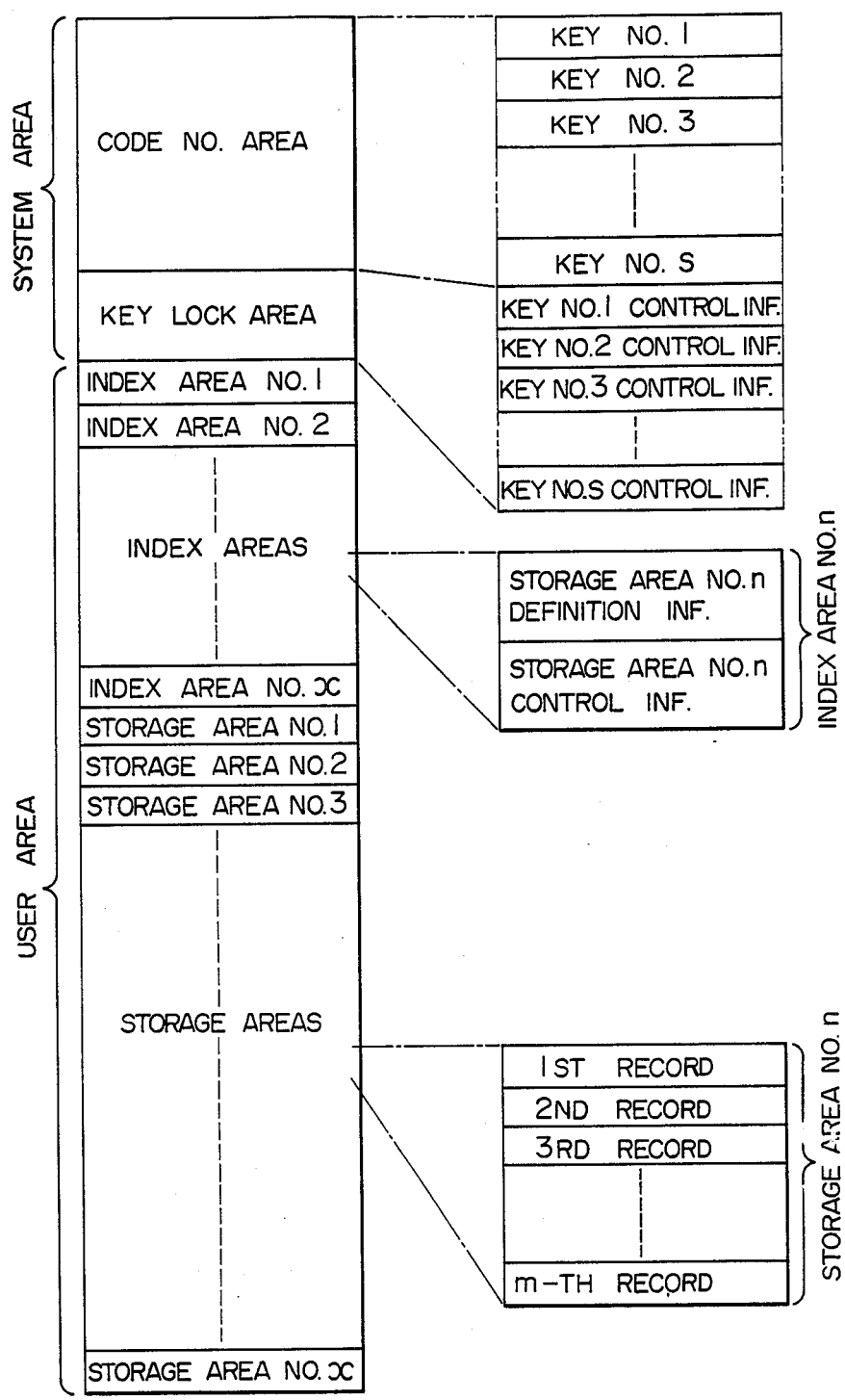

FIG. 3

| 7 | 6 | 5 | 4 | 3 | 2 | 1 | 0 |
|---|---|---|---|---|---|---|---|

STORAGE AREA DEFINITION INFORMATION:

| Byte | Content |
|---|---|
| 1st | STORAGE AREA START ADDRESS (HIGHER BITS) |
| 2nd | STORAGE AREA START ADDRESS (LOWER BITS) |
| 3rd | W.S.L \| R.S.L |
| 4th | WRITE KEY LEVEL OF ENTERPRISE |
| 5th | READ KEY LEVEL OF ENTERPRISE |
| 6th | RECORD LENGTH |
| 7th | NUMBER OF RECORD |
| 8th | STORAGE AREA MODE |
| 9th | STORAGE AREA ID (1) |
| 10th | STORAGE AREA ID (2) |

STORAGE AREA CONTROL INFORMATION:

| Byte | Content |
|---|---|
| 11th | WRITE UNLOCK COUNT \| 0 \| WRITE KEY ERROR COUNT |
| 12th | READ UNLOCK COUNT \| 0 \| READ KEY ERROR COUNT |
| 13th | WRITE PHYSICAL RECORD NO. |
| 14th | STORAGE AREA STATUS |
| 15th | RESERVED (1) |
| 16th | RESERVED (2) | though two

COMPOSITE IC CARD

RELATED APPLICATIONS

Of interest to the present application are two other U.S patent applications, Ser. No. 879,287, filed on Sept. 5, 1986, and Ser. No. 891,876, filed July 30, 1986, now U.S. Pat. No. 4,734,568. Both applications are assigned to the assignee of the present application.

BACKGROUND OF THE INVENTION

The present invention relates to an integrated circuit (IC) card including IC's such as a microcomputer and a memory device, and in particular, to a composite IC card sharable among a plurality of enterprises which has an enhanced security of information for each enterprise by preventing illegal and erroneous usages and which comprises a memory area to be commonly used by the enterprises for an effective utilization of the memory.

In the following description, the term of enterprise is used to indicate an individual enterprise such as a bank, a department store, a clinic, a financial company; furthermore, each department or division in such an enterprise or a juridical person. For example, a deposit division, a loan division, an exchange division of bank A and a surgery department and a psychiatrist department of clinic B are each indicated as enterprises. Moreover, if the general affairs department, the sales department, and the research & development department of a company each take part in a service of utilization of the card, these departments each can be denoted as enterprises. In addition, the present invention is also applicable to a composite card for other than such enterprises. For example, when a card is used for a family, namely, when a card is shared among a husband, a wife, and a child; these members are treated like enterprises if the information thereof is to be separately controlled respectively in the card. In the following paragraphs, a description will be given of an example of a composite IC card for which a plurality of companies participate in the service thereof.

Since an IC card includes a microcomputer and a memory, the IC card constitutes by itself a small-sized information processor having the functions for judgment and storage. Consequently, the data security and safety can be further increased as compared with the conventional magnetic card such as a bank card. Furthermore, since the storage capacity has been greatly increased due to the advance of the IC technology, the IC card is highly expected as a data storage card.

Recently, there is proposed an IC card (to be referred to as a composite IC card herebelow) to be commonly used among many enterprises for conveniences of the card owners. In the past, for example, the cards to be used between a card owner and a plurality of enterprises such as a bank, a department store, a clinic, a financial company has been individually issued by the respective enterprises, and hence the card owner has been required to inconveniently carry a plurality of cards for the bank, the department store, and so on.

Consequently, there has been proposed an improvement which enables the processing between the card owner and these enterprises to be executed with a card. For example, the deposit record of a bank, the transaction record and the settlement of accounts of a department, the examination records of a clinic, and the records of credit transactions are to be entirely processed by use of a card. The composite IC card system is therefore implemented by composing a plurality of different service functions or by integrating several functions of a company into an IC card.

This is enabled by the increase of the storage capacity of the memory device included in the IC card.

The contents of information stored in the composite IC card include those commonly required for each enterprise such as the name, address, birthday, and occupation of the card owner and those individually required for each enterprise. The system must therefore allows the common information to be accessed from any enterprise and the individual information to be accessed only from the pertinent enterprise. That is, the deposit information of a bank cannot be accessed from a clinic, and contrarily, the information of clinical history cannot be accessed by a bank or a department store. For example, even in the same clinic, the recorded information of the psychiatrist department must be prevented from being easily accessed from the surgent department; on the other hand, the information of the internal division is to be commonly used in the maternity division in some cases.

As described above, for the composite IC card to be shared among a plurality of enterprises, the card access is required to be selectable such that a storage area for writing therein information of an enterprise is strictly prevented from being accessed from other enterprises depending on the content of the information or that an access to the storage area is allowed only for particular enterprises.

Generally, in an IC card system, when the card is used, a code number is entered to confirm that the card is being used by the proper owner, and only if the entered number is correct, the access to the information is allowed. In this case, from a point of view of prevention of an illegal card usage by a third person, it has been proposed to limit the number of error inputs of the code number; and if the predetermined limit number is exceeded, the processing by use of the card is prevented, so that the storage area of the card is not accessed.

For a composite IC card for which a plurality of enterprises take part in the service thereof, a recorded information to be exclusively used by an enterprise must not be manipulated by other enterprises, that is, the read and write operations of the data unique to each enterprise must be strictly controlled for the security of the information. Moreover, in a system in which the access to the entire card is locked when the limit of the invalid inputs of the code number reaches the predetermined limit, the card becomes to be unavailable for all enterprises at once, which leads to a loss of the convenience of the composite IC card. For the composite IC card as described above, there arises the problem different from those associated with the conventional, unifunctional IC card.

Against an illegal input of a code number by a malicious third party, the security of information can be enhanced by the means to lock the access to the storage area. For an erroneous input of a code number by mistake of a correct user, it is desirable to adopt a proper measure of the relief.

Particularly, for a multipurpose, composite IC card including a plurality of information systems therein so as to be used for various purposes, there may exist many enterprises simultaneously controlling such information systems contained in the IC card, which increases the possibility of the wrong input as compared with a single-purpose, IC card. In this case, moreover, the relief measure for the access lock is required to be taken for each enterprise.

There has been proposed a security system of an IC card in which the number of wrong inputs of a code is limited to prevent an illegal usage of the IC card by a third person other than the correct card owner and when the limit is exceeded, the processing by use of the IC card is inhibited. Since a plurality of code numbers of various kinds are assigned to a composite IC card, even if the access lock is set to a certain code when this security system is applied to the composite IC card, the processing is required to be enabled with the other codes.

To satisfy these requirements, even if a code is erroneously inputted exceeding the predetermined limit, the overall IC card should not be locked by means of, for example, a data access inhibit bit, an inhibit gate, or a memory destruction but it is desirable to make the code itself or the storage area assigned to the code to be unusable.

For a composite IC card as described above, there exists a sophisticated requirement with respect to the security of information to be satisfied as compared with the unifunctional IC card.

The co-pending U.S. patent application Ser. No. 891,876, now U.S. Pat. No. 4,734,568 filed on July 30, 1986 by the applicant of present application describes that a security level is set to each storage area of an IC card having a plurality of storage areas and that an access condition to a storage area is established according to the security level.

In the JPA No. 61-18794 filed on Sept. 16, 1978 in Japan with the priority of the France Patent Application No. 7728049 filed on Sept. 16, 1977 (Applicant: Honeywell Bull), there has been disclosed an IC card system having a plurality of storage zones and a plurality of keys.

Furthermore, the JPA No. 61-134872 filed on Dec. 5, 1984 in Japan by the Omron Tateishi Electronics Co. describes an IC card system capable of supporting a plurality of services.

In addition, the JPA No. 61-139876 filed on Dec. 13, 1984 in Japan by the Casio Computer Co., Ltd. has disclosed a personal identification IC card which can be used among a plurality of service organizations.

These cards each are composite IC cards for which a plurality of enterprises take part in the services thereof; however, the countermeasure to retain the security of information between the enterprises has not been described.

SUMMARY OF THE INVENTION

It is therefore an object of the present invention to provide a composite IC card in which a plurality of service functions and a plurality of control functions are included, the conditions required for the composite IC card are satisfied, the data security is provided for each enterprise, and the data storage areas can be effectively utilized.

To achieve this object, according to the present invention, there is provided a composite IC card including control systems for a plurality of different kinds of information systems comprising a plurality of writable storage areas for storing information, code store means for storing a plurality of codes necessary to access each said storage area, first code specify means for specifying a code necessary to access said each storage area, said code being selected from first codes set for said each storage area and corresponded to the different kinds of information systems, second code specify means for specifying at least a second code necessary to access said each storage area, said second code being set for said each storage area, code read means responsive to an instruction to access a desired storage area from an external device for reading said first code specify means set in the desired storage area; said code read means reading, when a first code necessary for the access is specified by said first code specify means, the specified first code from said code desired store area; and said code read means reading, when a second code is specified by said second code specify means, the specified second code from said code store means, collate means for collating a code inputted from an external device with a code read by said code read means, and means for allowing an access to the desired storage area when all collations of the codes in said collate means result in matching.

Another object of the present invention is to provide a composite IC card in which when the erroneous code inputs to the IC card exceeds the predetermined count, the access to the specified area is inhibited to further enhance the information security in the composite IC card.

Still another object of the present invention is to provide a composite IC card capable of releasing the access inhibit condition on the storage area, thereby effectively utilizing the multifunctionality of the composite IC card.

Further another object of the present invention is to provide a composite IC card in which when the erroneous inputs of the same kind of code reaches the predetermined count, the access to the storage area with the code is inhibited.

BRIEF DESCRIPTION OF THE DRAWINGS

The present invention will be apparent from the following detailed description taken in conjunction with the accompanying drawings in which:

FIG. 1 is a configuration diagram of a writable memory in an embodiment of the composite IC card according to the present invention;

FIG. 3 is a schematic diagram illustrating the configuration of an index area in a user area of the memory;

DESCRIPTION OF THE PREFERRED EMBODIMENTS

Figure 2:
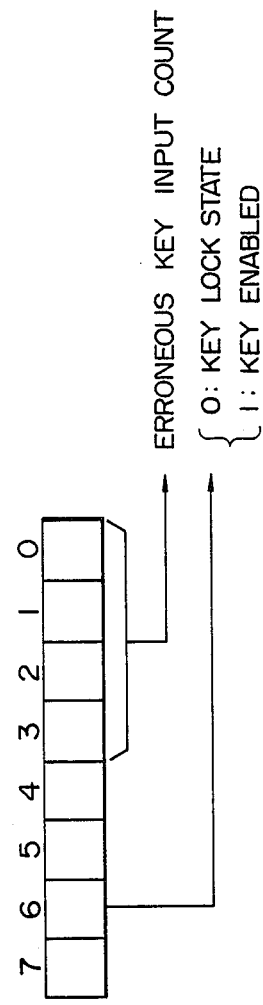
FIG. 2 is a configuration diagram of a key control information area.

The codes defined in the present invention include the numeric characters, the alphabetic characters, and the like and the number of digits and the number of characters are arbitrarily set, namely, the present invention is not limited only to the numeric or alphabetic characters. Since the code in an IC card generally indicates a code number, the term of code number or key is used for the code.

According to an embodiment of the present invention, a code number is inputted to an IC card through an IC card reader-writer from an external device and a read instruction and a storage area from which data is to be read are further entered for an information read operation or a write instruction and a storage area in which data is to be written are further entered for an information write operation. The kind of the code number inputted to the IC card is primarily classified into two numbers, namely, a first code number (enterprise key) set according to each enterprise and a second code number (a personal key, a control key, or an issuer key) selected according to the security level of each storage area. If a storage area specified for an information read or write is an area for recording information associated with a particular enterprise, the first code number necessary to access the storage area is to be specified. Furthermore, a second code number is selected and is specified to access the storage area. Consequently, if the specified first and second code numbers are not correctly inputted to the IC card, the specified storage area cannot be accessed.

With the provision described above, the security of the information for each storage area can be ensured in the duplicated fashion; moreover, since the storage areas can be divided into an area to be used by a single enterprise, an area to be shared among a plurality of enterprises, and an area to be commonly used by all enterprises, the convenience of the composite IC card such that the communications with many enterprises can be achieved with a card is effectively utilized, thereby leading to an effect that the security of the information recorded therein can be improved.

Referring now to the accompanying drawings, a description will be given of embodiments of the present invention.

FIG. 1 shows a configuration of a memory of a composite IC card in an embodiment according to the present invention. The memory includes a system area for storing information used to control the overall IC card and a user area for actually storing information to be recorded and for defining the information. In the embodiment of the present invention, the system area contains a code number area for storing correct code numbers used for this IC card and a key lock area for storing information about the key lock.

In the upper-right corner of FIG. 1, there is shown a detailed configuration of the code number area and the key lock area. The code number area is used to record at the predetermined addresses code numbers (keys), S (an integer) in number to be used with the IC card. At the predetermined addresses of the key lock area, there are provided key control information areas, S in number to store information about the respective code numbers (keys), namely, the key error count and key lock presence or absence. For example, if the code number is constituted from nine characters including letters or numeric characters, each area for storing a key comprises nine bytes. Each key control information area need only include one byte, which further divided into bits for counting the key error count and a bit for indicating the key lock absence or presence.

FIG. 2 shows a key control information byte in which the four low order bits are key error bits used to count the key error count (the number of erroneous inputs of the code number). For example, these bits are set to 0000 when the card is issued; and a binary value of one is added thereto each time a key error occurs. When 1 is added to 1111 and a result of 0000 occurs, the key lock is assumed. In this case, the key lock is set when 16 key errors take place. The key lock is established by use of a bit in this byte. In the example of FIG. 2, when the sixth bit is 0, the key lock is established; whereas, when this bit is 1, the key is indicated to be available. That is, when the key error count changes from 1111 to 0000 in the counting operation, the sixth bit (key lock bit) is changed from 1 to 0, thereby setting the key lock. This commonly applied to the other key control information byte. The limit of the key error count can be arbitrarily specified. If a value exceeding 16 is desired, the number of bits need only be increased. The code number may be a personal key which is a code number for specifying the card user, an enterprise key for specifying the relationship between data (or a storage area) and an enterprise, a control key used by an enterprise to control a particular data item, or an issuer key for specifying an issuer of a composite IC card. More precisely, a control key is a code number (key) necessary for the manager of an enterprise to use the card and is known only by the manager. An enterprise key specifies an enterprise allowed to use information recorded in a storage area and is known only by the enterprise set for each storage area. Consequently, the same number of enterprise keys and enterprises participating in the composite IC card service are prepared. The user area comprises a group of storage areas, X in number and a group of index areas, X in number corresponding to the storage areas. As instantiated with an index area No. n on the right-hand side of FIG. 1, each index area is divided into a storage area definition information corresponding storage area (the index area No. n corresponds to the storage area No. n) and a storage area control information, which will be later described in detail. As shown in an example of a storage area No. n in FIG. 1, each storage area includes the 1st record to m-th record (m is arbitrarily set). Consequently, the information is stored for each record, and the record length (in bytes) is beforehand set so as to be written as the storage area definition information of each index area.

FIG. 3 is a schematic diagram showing in detail the configuration of the index area No. n corresponding to the storage area No. n in the user area of FIG. 1. The 1st and 2nd bytes of the storage area definition information of FIG. 3 contain the definition of the storage area start address, which indicates the first address of the storage area No. n. The following 3rd byte is used to define the write security level (WSL) for a write operation and the read security level (RSL) for a read operation. The definition of the security level is established when the different security level is required depending on the content of information and is set by selecting the kind of the code number necessary for the access according to the security level, That is, the security level definition defines the code numbers by which are allowed to access the information of the pertinent storage area. In this embodiment, the security level is defined by use of four bits in which the most significant bit indicates the necessity or unnecessity of an enterprise key and the three low order bits denote the necessity or unnecessity of a personal key, a control key, or an issuer key. For example, these bits may be defined as follows.

| Most significant bit | 0: Enterprise key is required. <br> 1: Enterprise key is not required. |
|---|---|
| 3 low-order bits | 001: Only the personal key is required. <br> 010: Only the control key is required. <br> 011: The personal or control key is required. <br> 100: The personal and control keys are required. <br> 101: Only the issuer key is required. <br> 111: Code number is not required. |

In this case, the security levels are defined independently for the write and read operations. If many kinds of code numbers are used in the card system, the number of bits allocated for the security level definition need only be increased to cope therewith.

Next, the 4th and 5th bytes are used to define the kinds of the enterprise keys necessary for the write and read operations. Since the definition is made with eight bits, eight kinds of enterprises can be defined. Namely, up to eight enterprises can take part in the service of this composite IC card. If the greater number of enterprises are desired to participate in the card service, it is only necessary to increase the number of bits or to define each enterprise with a combination of the bits. The enterprise key level can be differently defined for the read and write operations according to the content of information. In this definition, each bit of the eight bits is corresponded to each enterprise. For example, bits 0–4 are assigned to bank A, department store B, hospital C, a financial company D, and bank E, respectively. If 0 is written in a bit, the enterprise key is indicated to be necessary; and if 1 is written therein, the enterprise key is assumed to be unnecessary. In the following definition, for example;

| 7 | 6 | 5 | 4 | 3 | 2 | 1 | 0 |
|---|---|---|---|---|---|---|---|
| 1 | 1 | 1 | 0 | 1 | 1 | 0 | 0 | to access the area, the enterprise key of the bank E, the department store B, or the bank A is required to be inputted.

The 6th byte defines the record length, whereas the 7th byte defines the number (m in FIG. 1) of records available in the storage area. Among these data, those defining the storage area start address, the record length, and the number of record are used as parameters to calculate an address for accessing the storage area. The 8th byte to tenth byte constitute a definition area used to add other processing function to the card system.

Figure 4:
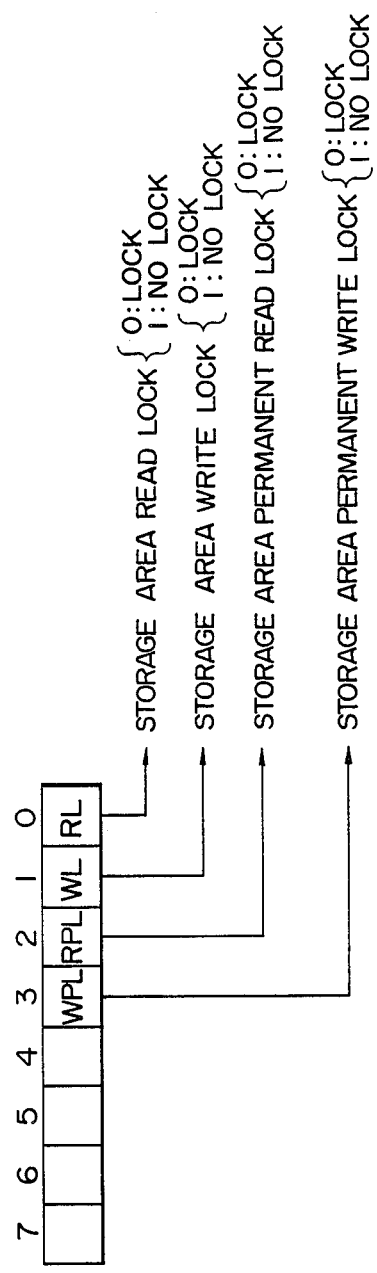
FIG. 4 is a schematic diagram showing the configuration of the storage area status byte among the storage area control information in the index area.

Two low-order bits of the 11th byte of the storage area control information are used to write therein the erroneous input count of the code number for a write operation. Similarly, two low-order bits of the 12th byte are used to store the erroneous input count of the code number for a read operation. The operation for writing the erroneous input count is accomplished differently from the operation to write the key error count of the key control information of FIG. 2. The details thereabout will be described later. The 13th byte is a kind of an address pointer for specifying a number (an address) of the next record to be written in the write processing procedure. The 14th byte is used as a storage area status byte in which when the error count of the 11th and 12th bytes reaches 3, a storage lock bit for inhibiting an access to the storage area and a permanent lock bit for permanently locking an access thereto are defined. Either bits are defined for the accesses of the read and write cases. Five high-order bits of the 11th and 12th bytes are used to write the unlock counts of the storage area lock bits in the 14th byte. These values can be written separately for the write lock and read lock. The storage area lock cannot be unlocked by an unauthorized person, namely, the predetermined code number and command must be inputted for this purpose. This unlock is provided for the relief means for a lock due to an erroneous input of a code number by mistake made on the side of the correct card user or enterprise. However, if the number of unlock operations reaches the predetermined count, for example, 31 in this embodiment, and thereafter if the storage area is set to the locked state, the lock for the storage area cannot be unlocked permanently. In this case, the permanent lock bit is written in the storage area status of the 14th byte. FIG. 4 shows an example of the storage area status byte. Incidentally, the 15th and 16th bytes of the storage area control information are reserved for the future use.

Figure 5:
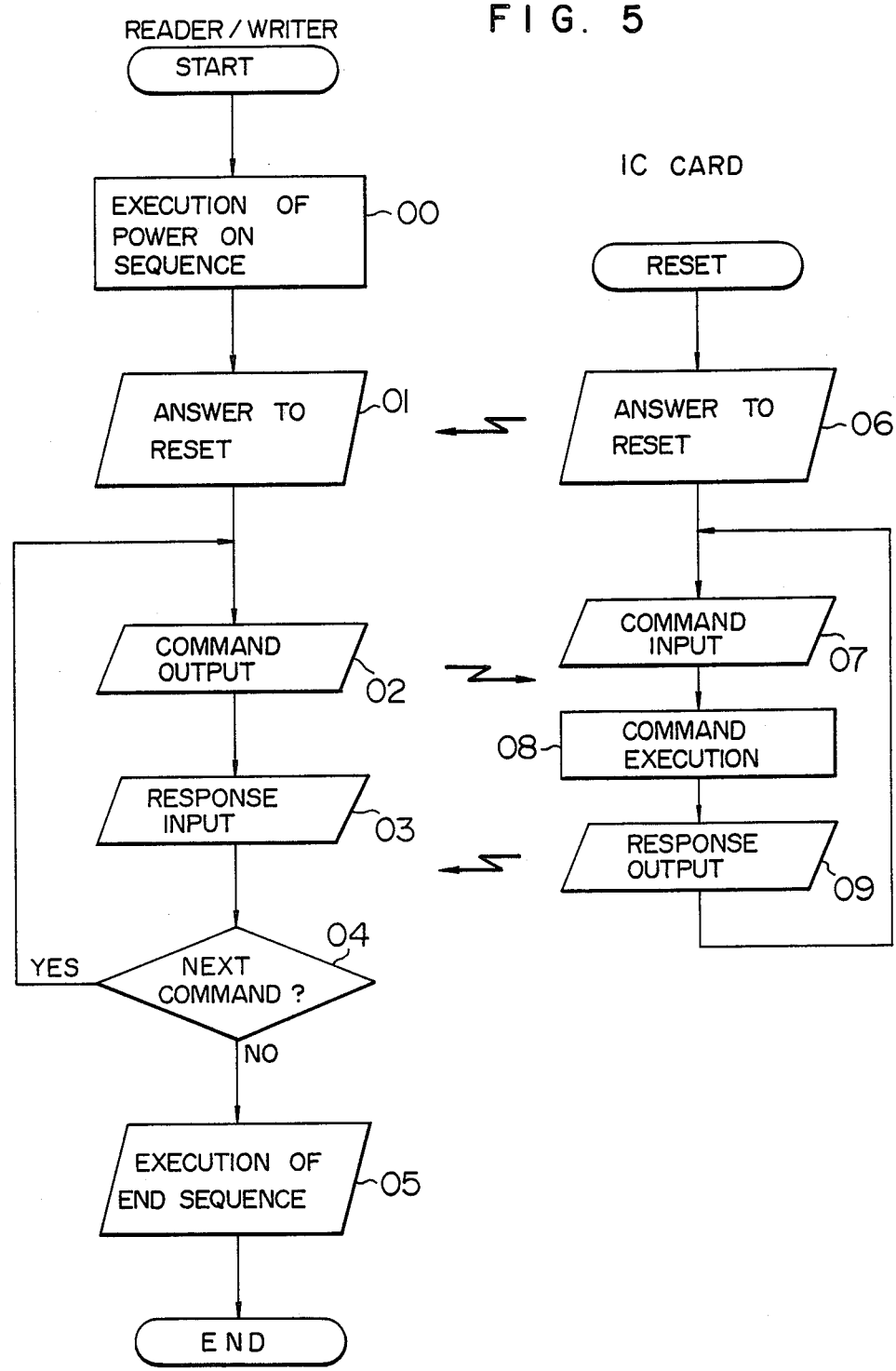
FIG. 5 is a flowchart showing the basic procedures of the operation between the IC card reader-writer and the IC card.
Figure 6:
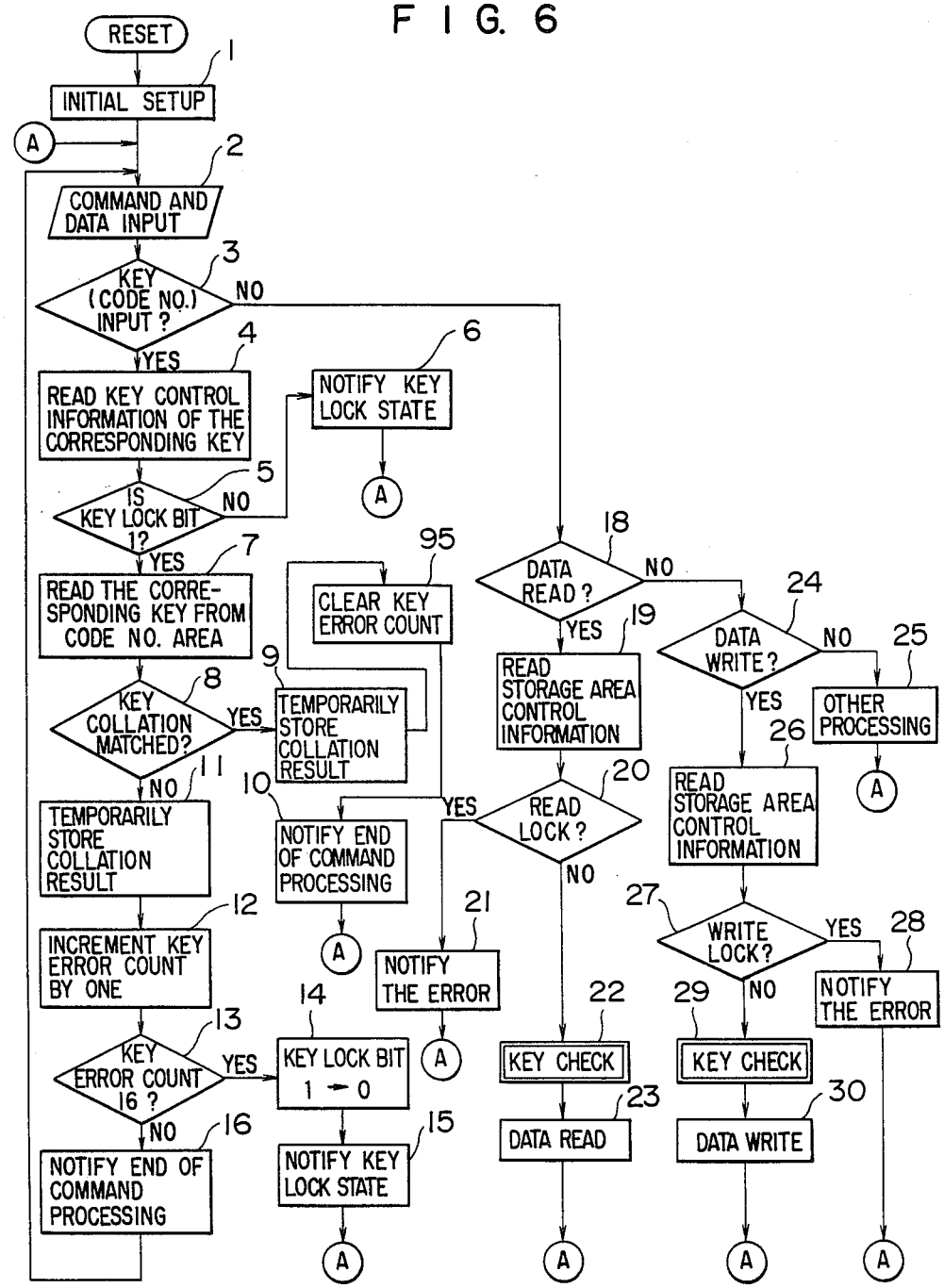
FIG. 6 is a flowchart illustrating an embodiment of the read and write operations on a composite IC card including the key lock operation according to the present invention.
Figure 8:
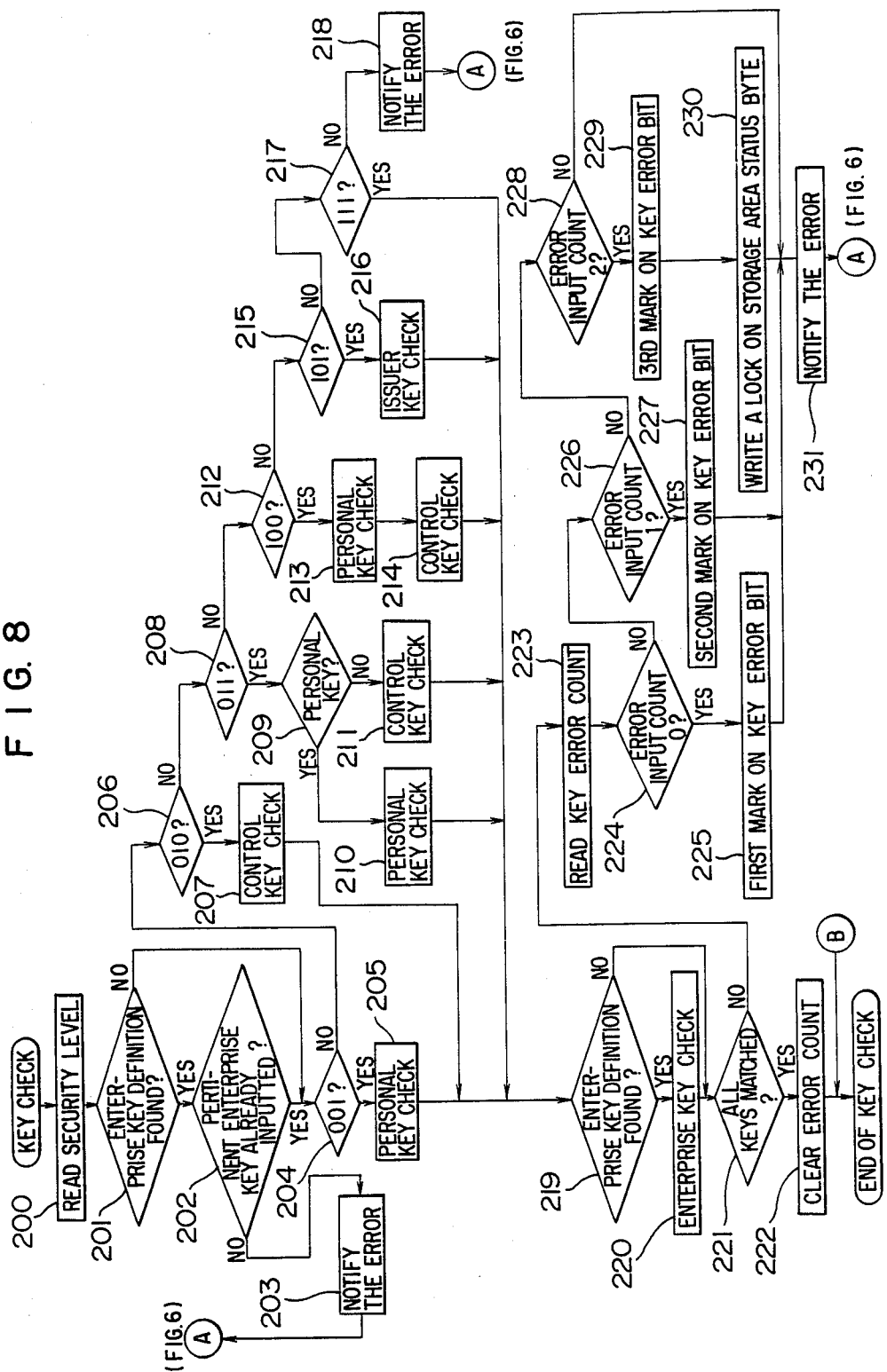
FIG. 8 is a detailed flowchart of the key check step in the flowchart of FIG. 6.

Referring now to FIGS. 5, 6, and 8, the read and write operations will be described in conjunction with an embodiment of the composite IC card according to the present invention.

FIG. 5 is a flowchart of the fundamental operation of an IC card (not shown) and a reader-writer (not shown) each connected to a host computer (not shown). The IC card reader has a card insert section (not shown) and when a card is inserted into the insert section, an electric connector of the card and a contact point of the reader-writer are brought into contact with each other. The connection between the card and the card reader-writer is not limited to a metal contact such as a metal conductor, namely, signal transmit means capable of transmitting a signal between the card and the card reader-writer such as optical connect means and acoustic connect means of the noncontact type can also be used. When the IC card is installed in the IC card reader-writer and the connection therebetween is established, the IC card is powered in step 00 and the signals such as a clock pulse are started to be supplied to the card. On receiving the power and the clock pulse, the card is set to an operable state, which is then notified to the reader-writer in step 06. In step 02, the reader-writer transfers a command from the host computer to the card. The commands include those for transferring a code number, for reading data, and for writing data. The steps 00–09 of FIG. 5 are executed for each command. On receiving a command in step 07, the card executes step 08 and transfers a result of an execution of the command to the reader-writer in step 09. When receiving the result of the command execution in step 03, the reader-writer performs a check to determine whether or not the next command has been received from the host computer. If the command has been received, control returns to the step 02 to repeat the procedures described above. When all processing for the command is finished, the reader-writer ends the operations such as the power supply to the card to finish the operation of the IC card and then performs the necessary operations, for example, to notify the completion of the processing.

FIG. 6 is a flowchart showing the procedures of the read and write operations of the composite IC card in which the key lock can be effected according to the present invention and the steps 07, 08, and 09 are illustrated in detail.

In the present embodiment of this invention, a total of 11 kinds of keys (code numbers) are set, and consequently, the code number area of the system area comprises 11 code number storage areas for key No. 1 to key No. 11. In addition, the key lock area also includes 11 key control information areas. When the key error count reaches 16, the key lock is established.

The flowchart of FIG. 6 will be next described. First, the card user installs an IC card in the reader-writer and indicates a desired operation together with a code number and data. When the car is inserted, the initial setup is accomplished in step 1. In the subsequent step 2, the first command or data is inputted, for example, a transfer command to transfer a code number from the reader-writer to the IC card, a read command with a storage area from which data is to be read, or a write command with a storage area for writing data therein is inputted. In step 3, the code number (key) is check to determine whether or not the key has been inputted (transferred). The transferred code number is temporarily kept in an RAM (not shown) of the microcomputer. In step 4, the key control information is read from a key lock area associated with the transferred code number. In step 5, the key lock bit of the key control information thus read is checked to determine whether "1" has been written in the key lock bit. If "0" is found, the key (code number) is already in the locked state (usage is inhibited), step 6 notifies the reader-writer that the key has been locked. If the key lock bit is "1" in the step 5, the key has not been locked and a key having the corresponding number is read from the code number area. Next, in step 8, the transferred key is collated with the key read from the code number area to verify the correctness of the transferred key. If they coincide with each other, the transferred key is a correct key and hence the next step 9 stores an indication that the key is correct. In step 95, the key error count (the erroneous input count of the key) is cleared to 0000. In step 10, the completion of the processing for the key transfer command is notified to the reader-writer and then the program enters the state for receiving the next command or data. If the key collation in the step 8 results in the unmatching, the condition is stored in the RAM in step 11. The key error count (the erroneous input count of key in FIG. 2) of the key control information is incremented by one. In step 13, the incremented key error bits are checked to determine whether or not the key error count is 16. If the key error bits are 0000, this condition indicates that 0000 results by adding one to 1111, which means that the key error count has reached 16. In this case, the key lock bit is changed from "1" to "0" in step 14. In step 15, the condition that the key lock state has been set is notified to the reader-writer and the program enters the state to wait for the next command. If the key error bits are other than 0000, the completion of the processing for the key transfer command is notified to the reader-writer in step 16 and the program enters the state to wait for the next command. When a plurality of keys are entered, the key transfer command is executed for each key; consequently, in the processing of an IC card using key No. 1 and key No. 2, when these keys are inputted to the reader-writer, the key transfer command for the key No. 1 if first executed. When the program proceeds to step 16, control returns to the step 2 because the transfer command is required to be executed for the subsequent key No. 2. That is, the steps from the step 2 to the step 16 are repeated for the transfer command of each key necessary for the processing. When the transfer command processing is completed for all keys, for example, a read or write command is executed, and hence control returns from the step 16 to the step 2 also in this case. When a read or write command with the storage area number to read or write is inputted in the step 2, the key transfer is not required in the step 3 and hence control proceeds to step 18. In the step 18, the inputted command is checked to determine whether the command is a read command or a write command. If a read command is detected, control is passed to step 19, where the storage area control information (FIG. 3) of the index area is read from the storage area specified by the command. The storage area status byte (FIG. 4) is then extracted from the storage area control information, and then step 20 checks to determine whether the read lock or the permanent read lock has been set. If the read lock state is assumed, an error is notified in step 21 and the program enters the state to wait for other command. In other than the read lock state, the key check is performed in step 22. This includes a check at the security level, a check for the unmatching of the code number, and a lock check of a storage area. The detailed description will be described later with reference to FIG. 8. If the key check results in OK, the read operation is executed on the specified storage area in step 23. If the command inputted in the step 2 is a write command containing a specification of a write storage area and a write data, control is passed from step 24 to step 26. If the command is neither a read command nor a write command, the pertinent other processing is accomplished in step 25 and then control returns to the step 2. In step 26, a storage area control information of the index area is read from the storage area specified by the command. From the storage area control information, the storage area status byte is extracted and is checked to determine whether the write lock for the permanent write lock has been set in step 27. If the write lock state is found, the error is notified in step 28 and the program enters the state to wait for other command. In other than the write lock state, a key check is achieved in step 29. If the key check results in the matching, the data is written in the specified storage area.

Figure 7:
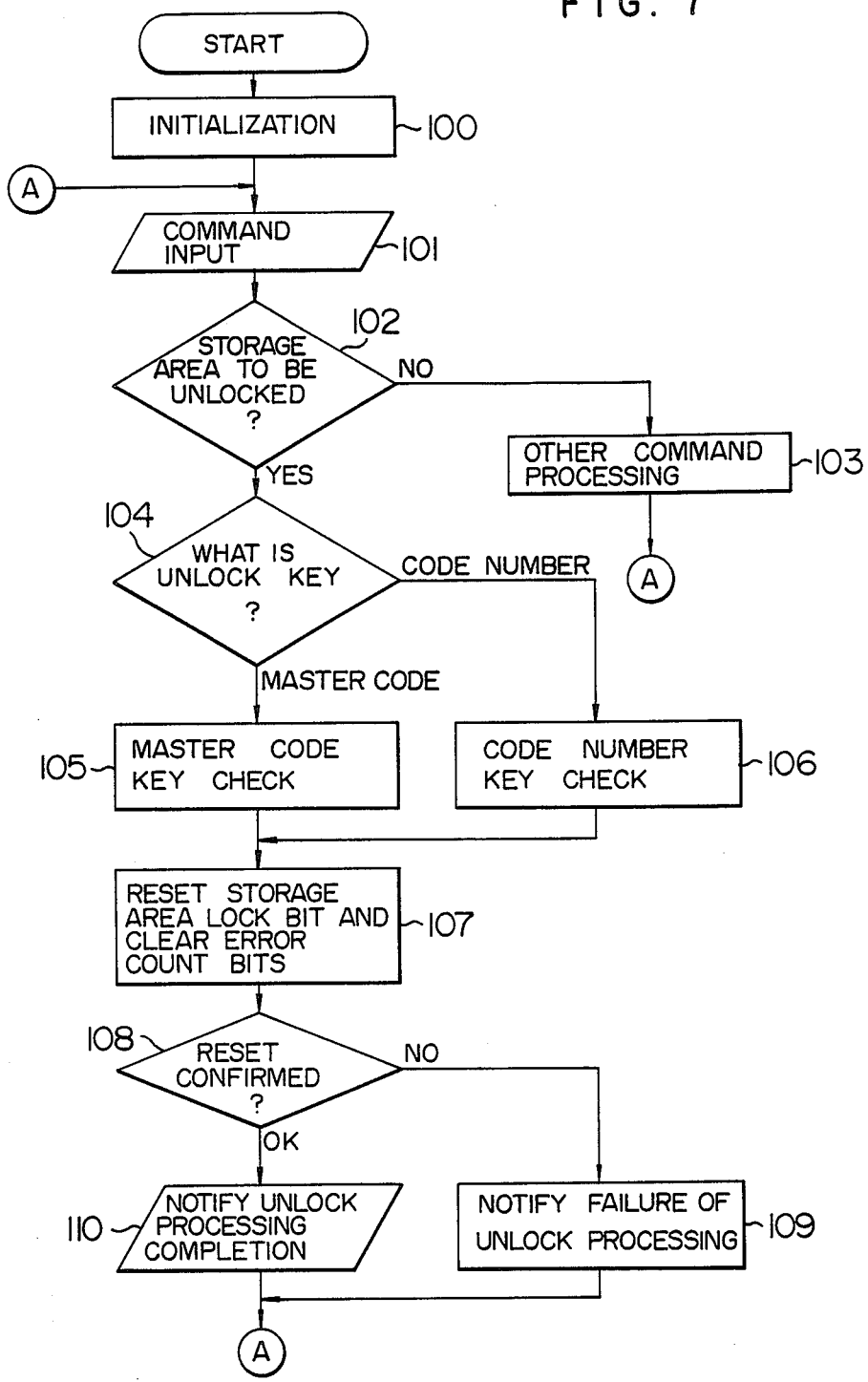
FIG. 7 is a flowchart depicting an embodiment of the storage area unlock operation according to the present invention.

Referring now to FIG. 7, the unlock operation of a storage area will be described. First, an IC card is installed in the reader-writer or a device dedicated to the unlock operation. The unlock operation is executed when an unlock command is inputted. In a usual case, prior to the execution the unlock command, an input of a master code or a code number necessary for the unlock operation is received as a key input command, which corresponds to the steps 1-16 of FIG. 6. The unlock command for a storage area is inputted when control returns to the step 2 after the key input command is finished in the step 16 of FIG. 6. The processing of the step 3 results in "no" and furthermore the results of the steps 18 and 24 are "no"; consequently, control is passed to the step 25. Step 101 in the flow of the unlock command for a storage area shown in FIG. 7 corresponds to the step 2 of FIG. 6; whereas, the processing of the step 25 and other steps correspond to the steps 102 and subsequent steps of flowchart of FIG. 7.

In the step 101, an IC card command is inputted. In the step 102, the IC card command is checked to be determined whether or not the command is an unlock command for a storage area. If the command is other than an unlock command, other command is executed in the step 103. If the step 102 determines that the command is an unlock command, control is passed to the step 104. The unlock command contains a specification of a storage area to be unlocked. In step 104, the key for the unlock operation is judged for the determination. That is, the key is determined to be a code number (a personal key, a control key, or the like) defined with a security level or other particular master code. In a case of a master code, the step 105 is achieved. In a case of a code number, control is passed to the step 106. In the steps 105 and 106, the result of key collation in the step 11 of FIG. 6 is read, and if the collation result indicates the matching, the program proceeds to the step 107, which then resets the storage area lock bit of the storage area status byte (FIG. 4) and clears the key error count bits (FIG. 3). If the key check result is the unmatching, the step 11 and subsequent steps of FIG. 6 are executed. In the step 108, it is confirmed whether or not the processing has been correctly accomplished in the step 107. If this is not the case, the step 109 is executed to notify that the unlock processing has been failed. If the unlock operation has been correctly finished, the completion of the processing is notified in the step 110.

In the embodiment above, a case has been described in which the unlock processing can be accomplished with a master code or a code number; however, the present invention is also applicable to a case where only the master code is used and a case where only the code number is specified. In such cases, the step 104 is omitted, namely, the step 105 or 106 follows the step 102.

FIG. 8 shows in detail the step of the key check of FIG. 6. In this example, as already described, a personal key, a control key, an issuer key, and eight kinds of enterprise keys are assigned so as to be recorded at the addresses of the code number areas No. 1 to No. 11. Since the key check 22 for a read operation is fundamentally identical to the key check 29 for a write operation, the description will be given of a case of a read processing.

For example, a card owner input the read command from a host computer terminal or an IC card reader-writer to the IC card, and specifies storage area number by parameters prepared in the system (FIG. 6, step )).

In step 200, the storage area definition information of an index area is read from the storage area specified with the read command. The read security level (RSL) is extracted from the storage area definition information, and then in step 201, it is checked whether the most significant bit (bit 4) of the security level bits is 0 (requiring an enterprise key) or 1 (not requiring an enterprise key). If 0 has been written, step 202 checks whether or not the enterprise key has already been inputted; otherwise, step 203 notifies the error to the reader-writer. If the enterprise key has already been inputted, control is passed to step 204 to check the security level. If the step 201 determines that the most significant bit of the security level is 1, the next step 202 is skipped and step 204 is executed. Steps 204, 206, 208, 212, 215, and 217 check three low-order bits of the security level bits to determine the security level defined for the storage area. In the step 204, the security level is checked against 001. In the example above, "001" is the definition requiring only a personal key, and hence the step 205 reads from the RAM the collation result temporarily stored in the steps 9 and 11. If the collation result is the matching, control is passed to the next step; otherwise, the error notification is accomplished. If the bits do not contain "001", the step 206 is executed to check the bits against "010". If the bits are "010" which indicates that only a control key is necessary in the example above, the collation result of the control key in the steps 9 and 11 is read from the RAM. If the result is the matching, the next step is executed; otherwise, the error notification is achieved. If the bits are not "010" in the step 206, the step 208 is executed to check the bits against "011", which is the definition that a code number for a personal key or a control key is necessary; consequently, the step 209 checks whether or not a personal key has been inputted. If a personal key has been inputted, control proceeds to step 210, which reads from the RAM the collation result of the code number stored in the steps 9 and 11. If the collation result of the personal key is the matching, the next step is executed; otherwise, the error indication is effected. If the personal key is not found in the step 209, the step 211 is executed to read the collation result of the control key to check for the matching or mismatching of the control key. If the collation result is the matching, the next step is executed; otherwise, the error notification is accomplished. Step 212 checks the bits against "100". If this is the case, since "100" indicates that the code numbers of a personal key and a control key are both required, step 213 reads the collation result of the personal key. If the collation result is the matching, step 214 reads the collation result of the control key. If the collation result is the matching, the next step is executed. In either case of the steps 213 and 214, if the collation result is the mismatching, the error notification is effected. In this embodiment, although the control key is assumed to be shared among the enterprises, the control key may be unique to each enterprise or a control key may be shared among some enterprises. If a control key is to be uniquely assigned to each enterprise, the bits for defining the necessary control keys are provided in the storage area definition information. In a case of a read or write processing, the defined control key is read from the code number area of the system area and is collated with the inputted code number. Similarly, in a case where a control key is shared among some enterprises and another control key is commonly used among the other enterprises, the control key definition bits need only be provided in the storage area definition information. If the bits are not "100" in the step 212, the bits are checked against "101" in step 215. If this is the case, the issuer key is required and hence the collation result of the issuer key is read. For the matching result of the key collation, the next step is executed; whereas for the mismatching result thereof, the error notification is effected. If the bits are not "101" in the step 215, the bits are checked against "111" in step 217. For other than "111", the error notification is achieved. For "111", even if the storage area does not require a code number, there may be a case where an information (for example, an information from a bank) for each enterprise is desired. For this purpose, control is passed to step 219. In the step 219, the storage area definition information is read to check again to determine whether or not the enterprise key is necessary, namely, the upper-most bit of the RSL is checked against "0" (necessary) and "1" (unnecessary). For the bit of "0", the collation results of the steps 9 and 11 are read to check for the matching or mismatching of the enterprise key. If the matching results, the next step is executed; otherwise, the error notification is effected. If the bit is "1" in the step 219, control skips step 220. In step 221, the collation results of the code numbers are entirely checked to determine whether or not the collation results are the matching for all code numbers. If this is the case, step 222 reads the storage area control information and resets the key error count to 0, thereby terminating the key check. When the collation results include at least a mismatched code number in the step 221, the read key error count bits are read. In step 224, if the key error count is 0, step 225 is executed to increment the content of the key error count bits by one, so that the key error count is set to one. It should be noted that these key error count bits are valid only in the storage area control information, namely, these bits are different from the key error bits in the key lock area. In the step 226, when the key lock error count thus read is one, control is passed to the step 227 to increment the count by one, thereby setting the key error count to two. If the key error count read in the step 226 is two, step 229 increments the count by one to set the value to three. Thereafter, the read lock indication is written in the storage area status byte of the storage area control information, and the error notification is made in step 231. The step 219 may be omitted; in this case, however, the step 220 "the enterprise key check" is executed immediately after the step 202 "check for the pertinent enterprise key to determine whether or not the key has already been inputted" results in Yes.

When accessing the storage area in which the enterprise key is defined, the card owner need only input a personal key and a command to cause the host computer to automatically transfer the enterprise key to the IC card because the card owner does not have information about the enterprise key. In this case, the external indication of the enterprise key is not performed to prevent the card owner from knowing the enterprise key, namely, the enterprise key is internally processed within the card.

Figure 9:
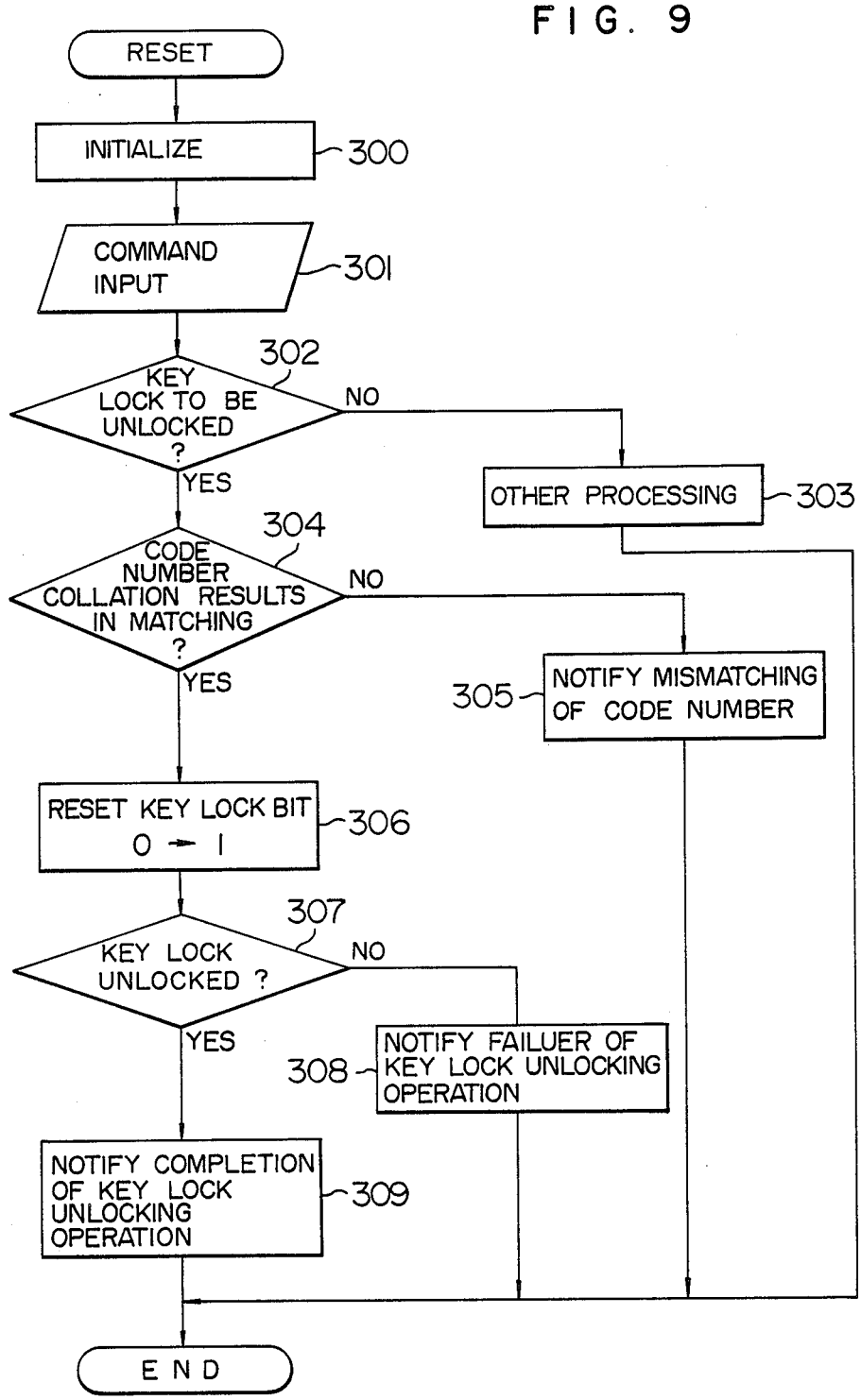
FIG. 9 is a flowchart showing the key lock release operation according to the present invention.

When the error input count of the code number reaches 16 in the procedures described above, the IC card processing with the code number is prevented after this point. However, in a case where the code number is undesirably locked by an intentional error input by a third person, an error input due by mistake by the card owner, or the like and the access is allowed only by use of the code number, it is desirable to provide a relief means to unlock the key lock. FIG. 9 shows a procedure applicable to the composite IC card of the present invention to unlock such a key lock condition. This relief means utilizes the key error bit, namely, when a particular code number and a key lock unlocking command are inputted, the code number subjected to the key lock is unlocked so as to be used again. By applying the key lock relief means to the composite IC card of the present invention as necessary, the convenience of the IC card is increased and at the same time, the security of the IC card by the key lock is also retained.

First, an IC card is installed in the card reader-writer (step 300) and a key lock unlocking command is inputted together with the necessary code number and the kind of the code number (for example, a personal key or an enterprise key) to be unlocked (step 301). In the subsequent step 302, the command is checked to determine whether or not the command is a key lock unlocking command. If "no" results, other processing is assumed in step 303. In step 304, the corresponding code number is read from the code number area to collate the code number with the inputted code number. In this case, the kind of the code number to be collated can be arbitrarily specified when the IC card system is designed. For example, if the personal key is set, even when a code number is undesirably locked due to an error input by a third person, the card owner can unlock the key lock condition if the card owner has the information about the personal key. If the issuer key is set rather than the personal key, even when a personal key is locked due to an error input by mistake by the card owner, the lock on the personal key can be unlocked by notifying the issuer the identification of the correct owner of the card. In the IC card system, it is possible to beforehand set other key, the all portions of a plurality of keys, or a portion of a plurality of keys. Next, the key lock bit corresponding to the code number for which the unlock is instructed is changed from "0" to "1" in step 306. In step 307, the content of the key lock bit is checked against "1" and key error bits are checked against 0000, thereby determining whether or not the key lock has been unlocked. If the step 307 results in "no", step 308 is executed to notify the reader-writer the condition that the key lock unlocking operation has been failed. If the unlocking has been correctly accomplished, step 309 notifies the reader-writer the completion of the key lock unlocking operation, thereby terminating the processing.

Referring now to FIGS. 10(A)-10(E), a description will be given of an example of the grouping of the enterprises in the storage areas of the composite IC card according to the present invention. Storage area specification is included in the read command or in the write command in the following example, as described before. In FIGS. 10(A)-10(E), $P_1, P_2, \ldots P_6$ (numeric characters, characters, symbols, or combinations thereof) each indicate second codes (code numbers) defined at the respective security levels; whereas $U_1, U_2, \ldots U_8$ (numeric characters, characters, symbols, or combinations thereof) each indicate first codes (code numbers). In this diagram, the portions enclosed with solid lines each constitute a storage area and those enclosed with broken lines each denote groups corresponding to the respective enterprises.

Figure 10A:
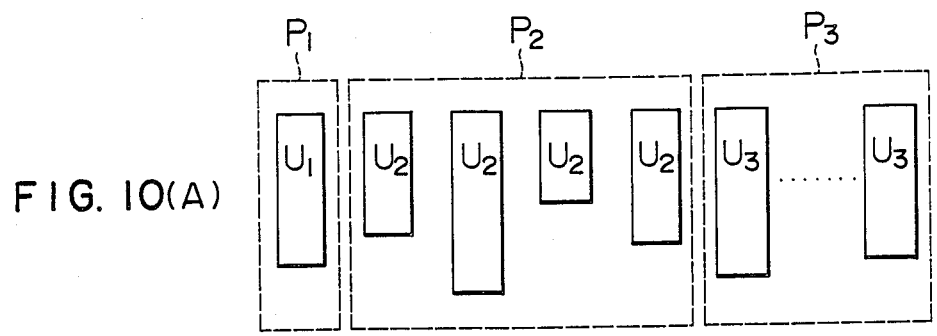
FIG. 10(A) to FIG. 10(E) are schematic diagrams illustrating examples of the grouping of storage areas in the composite IC card according to the present invention.
Figure 10B:
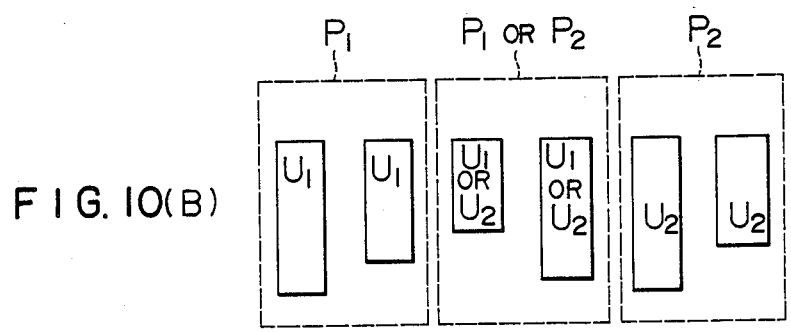

In the example of FIG. 10(A), a plurality of storage areas are classified into three groups assigned with the group identification codes $P_1$, $P_2$, and $P_3$, respectively. In an actual utilization example, personal information items such as addresses, names, families, historical data, and property lists are recorded in the storage area assigned with a code $U_1$ and the code number for these information items is set to be a personal key. In this case, the storage area cannot be accessed unless both the personal key $P_1$ and the enterprise key $U_1$ (it can be considered to be a kind of an enterprise key when a person as an enterprise). Consequently, if other enterprise participating in the card service, for example, a bank desires to access this area, the bank is required to obtain consent of the person and asks the person to input the personal key $P_1$ and the enterprise key $U_1$. Even if a third person obtains an information only about the enterprise key $U_1$, the storage area cannot be accessed. Moreover, a group of storage areas denoted by the code number $P_2$ are used to record information related to banks. Namely, information about the banks A, B, C, and D is stored in the four areas each being corresponded to the enterprise key $U_2$. If the code number $P_2$ is a control key known only by a particular person in charge (or a related section) of a bank, this group of storage areas can be set as information areas to be commonly used by the four banks, to that only the particular person of each bank can access these areas. In addition, if a group of storage areas denoted by the code number $P_3$ is specified to store information of a financial company, the code number $P_3$ is a control key known only by a particular person in charge (or a related section) of the company, namely, the storage areas can be accessed when the control key $P_3$ and the enterprise key $U_3$ are inputted Next, FIG. 10(B) shows an example where the storage area is divided into three groups in which a group can be accessed when two kinds of code numbers selected from the control keys $P_1$ and $P_2$ and enterprise keys $U_1$ and $U_2$ are inputted. For example, the area of the central group can be accessed if a control key $P_1$ and an enterprise key $U_1$, a control key $P_1$ and an enterprise key $U_2$, a control key $P_2$ and an enterprise key $U_2$ or a control key $P_2$ and an enterprise key $U_1$ are inputted. Namely, these areas constitute a group of common data.

Figure 10C:
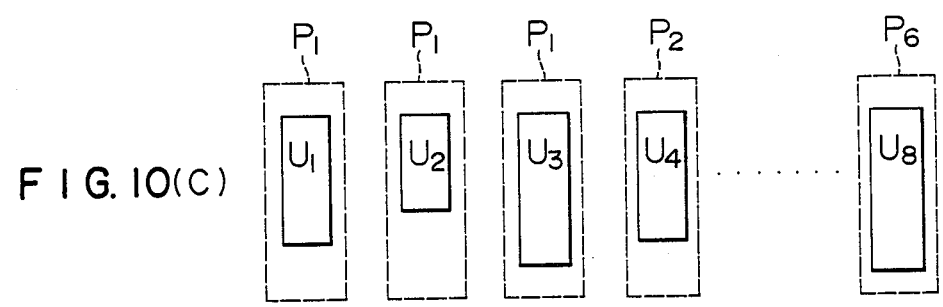

FIG. 10(C) shows a case where a composite IC card is shared among a plurality of persons (for example, in a family). That is, the code numbers $P_1$ to $P_6$ are personal keys to be assigned to the father, mother, and children, respectively. The personal information can be therefore controlled for each group. Alternatively, these keys may be set such that $P_1$ is assigned as a personal key and $P_2$ to $P_6$ are assigned as group indentification codes for information of banks, financial companies, clinics, and the like. Moreover, these keys may be set such that $P_1$ is assigned as a personal key and $U_1$ to $U_3$ are set for the respective enterprises. For example, $U_1$ is an enterprise key of the bank A, $U_2$ is an enterprise key of the bank B, and $U_3$ is the enterprise key of the financial company.

Figure 10D:
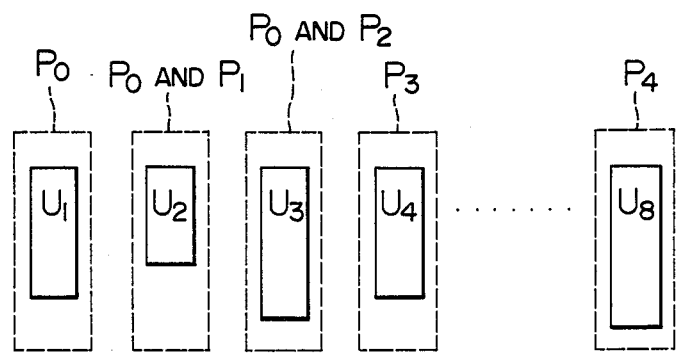

FIG. 10(D) shows a case where a plurality of group identification codes are assigned to each group. This example corresponds to the embodiment of FIG. 8. That is, the code numbers $P_0$, $P_1$, $P_3$, and $P_4$ corresponds to the personal key, the control key, the issuer key, and the like, respectively of FIG. 8. $U_1$ to $U_8$ are enterprise keys, respectively. In this example, the group is set to correspond to each enterprise. Although only a storage area is shown for each groups, there may be allocated a plurality of storage areas to each group.

Figure 10E:
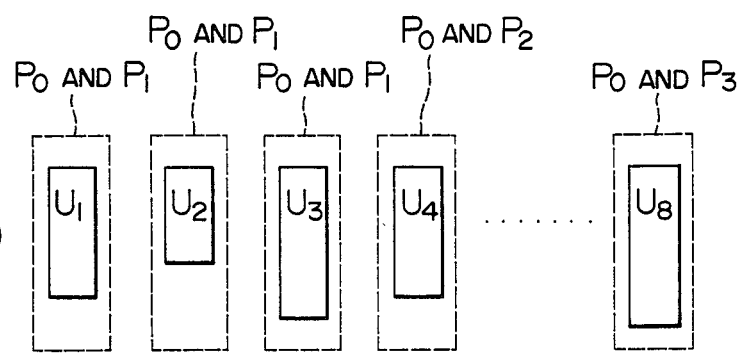

FIG. 10E is a case where the code number $P_0$ is commonly assigned to all groups, for example, $P_0$ is a personal key, $P_1$ to $P_3$ are control or issuer keys, and $U_1$ to $U_8$ are enterprise keys. The storage area can be accessed only when three kinds of keys are inputted.

The classification of the storage areas and the actual utilization examples are not limited to those described above, namely, the present invention is applicable to all combinations derivable from the scope of claim of the present application.

Although the embodiment has been described in conjunction with a composite IC card for which banks, clinics, department stores, and financial companies participate in the service thereof, but the composite IC card of the present invention is not restricted by those enterprises of the embodiment, namely, a person and various enterprises such as a cultural facility, a public agency, a school, a library, a leisure facility, a hotel, a transportation facility can also take part in the card service, which enables to prevent the illegal card usage while retaining the convenience of the composite card and the security of information between the enterprises. Moreover, in addition to the composite IC card, an IC card for a single enterprise may also be used if a plurality of code numbers are set thereto, thereby obtaining the same effect as for the embodiment described above.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A composite IC card for a plurality of different kinds of information systems, including:
   a control unit for receiving commands, designation codes from outside the IC card, said designation codes including first and second index codes, and for processing said commands and said designation codes from outside the IC card;
   a user storage area having a plurality of storage areas for storing information, said storage areas being classifiable into groups corresponding to different information systems and each storage area within one of said groups having a security level;
   means for storing enough of said designation codes to designate each of said storage areas as designated storage areas;
   first means for accessing one of said groups of said storage areas based on said first index code;
   second means for accessing at least one of said storage area within one of said groups of storage areas base on said second index code;
   first means for internally verifying said first code for said first accessing means;
   second means for internally verifying said second code for said second accessing means; and means for accessing said designated storage areas when said first accessing means verifies said first code and said second accessing means verifies said second code.

2. A composite IC card according to claim 1 further including:
   means for counting errors when a verification of said first and second verifying means results in an error; and
   means for inhibiting access to any given one of said designated storage areas when said error count means counts a predetermined number of errors and stores an error count value for said given designated storage area.

3. A composite IC card according to claim 2 wherein said error count means counts errors for each of said given designated storage areas so that when a plurality of said first and second codes are verified by said first and second verifying means and any one thereof results in error said error count means accumulates the count value of the error count means in each of said given designated storage area.

4. A composite IC card according to claim 2 wherein said first and second verifying means includes means for storing the error count from said designated storage areas and said accessing means reads the error count from said designated storage areas.

5. A composite IC card according to claim 2 further comprising reset means responsive to at least a particular input signal for resetting the count value of said error count means to zero.

6. A composite IC card according to claim 5 wherein said particular input signal is a predetermined code selected from said first and second index codes.

7. A composite IC card according to claim 5 wherein said particular input signal is a predetermined third signal.

8. A composite IC card according to claim 5 wherein said reset means further includes means for effecting a judgment, when the particular input signal is inputted thereto, to determine whether the input signal is said first or second index code or a third predetermined code and means for resetting the count value of said error count means to zero only when said input signal is said first or second index code or the third code.

9. A composite IC card according to claim 5, wherein said IC card further includes means for counting a number of resetting operations and means for inhibiting said reset means when said number reaches a predetermined value.

10. A composite IC card according to claim 9, wherein said permanent lock means independently counts the number of resetting operations in each attempted access for each of said designated storage areas.

11. A composite IC card according to claim 2 further including means for granting access to each of said storage areas in response to a particular input signal from an external device by resetting said inhibiting means.

12. A composite IC card according to claim 11 wherein said particular input signal is a predetermined third code.

13. A composite IC card according to claim 1 wherein said second accessing means comprises means for arbitrarily setting a specific second code necessary to access each of said designated storage areas according to said security level of each of said storage areas.

14. A composite IC card according to claim 1 wherein said first and second accessing means are separately provided to be used in a case where information is read from said designated storage area and in a case where information is written in said designated storage area.

15. A composite IC card according to claim 1 wherein said first accessing means comprises means for accessing a plurality of said groups based on a plurality of said first index codes.

* * * * *

UNITED STATES PATENT AND TRADEMARK OFFICE
CERTIFICATE OF CORRECTION

PATENT NO. : 4,849,614

DATED : July 18, 1989

INVENTOR(S) : Hiroshi Watanabe et al.

It is certified that error appears in the above-identified patent and that said Letters Patent is hereby corrected as shown below:

| Column | Line | |
|---|---|---|
| 2 | 12 | Please delete "allows" and insert --allow--. |
| 2 | 52 | Please delete "becomes to be" and insert --then becomes--. |
| 6 | 5 | Please insert --is-- after "which". |
| 7 | 60 | Please delete "record" and insert --records--. |
| 9 | 24 | Please delete "car" and insert --card--. |
| 10 | 49 | Please delete "for" and insert --or--. |
| 11 | 51 | Please delete "input" and insert --inputs--. |
| 11 | 54 | Please delete "step))." and insert --step 2).--. |
| 14 | 24 | Please delete "the all" and insert --all the--. |
| 14 | 64 | Please delete "when" and insert --with--. |
| 15 | 12 | Please delete "to" and insert --so--. |

UNITED STATES PATENT AND TRADEMARK OFFICE
CERTIFICATE OF CORRECTION

PATENT NO. : 4,849,614
DATED : July 18, 1989
INVENTOR(S) : Hiroshi Watanabe et al.

It is certified that error appears in the above-identified patent and that said Letters Patent is hereby corrected as shown below:

| Column | Line | |
|---|---|---|
| 15 | 48 | Please delete "corre-". |
| 15 | 49 | Please delete "sponds" and insert --correspond--. |
| 15 | 53 | Please delete "groups" and insert --group--. |
| 16 | 39 | Please delete "area" and insert --areas--. |
| 16 | 40 | Please delete "base" and insert --based--. |
| 16 | 66 | Please delete "area" and insert --areas.--. |

Signed and Sealed this

Fifth Day of November, 1991

Attest:

HARRY F. MANBECK, JR.

*Attesting Officer*         *Commissioner of Patents and Trademarks*